US012779920B2

(12) United States Patent
Ryutaki et al.

(10) Patent No.: US 12,779,920 B2
(45) Date of Patent: Nov. 3, 2026

(54) CRASH BOX

(71) Applicant: TOYODA IRON WORKS CO., LTD., Aichi (JP)

(72) Inventors: Kozo Ryutaki, Aichi (JP); Akiyoshi Yamamoto, Aichi (JP)

(73) Assignee: TOYODA IRON WORKS CO., LTD., Aichi (JP)

( * ) Notice: Subject to any disclaimer, the term of this patent is extended or adjusted under 35 U.S.C. 154(b) by 337 days.

(21) Appl. No.: 18/601,247

(22) Filed: Mar. 11, 2024

(65) Prior Publication Data

US 2024/0399989 A1 Dec. 5, 2024

(30) Foreign Application Priority Data

Jun. 2, 2023 (JP) ................................ 2023-091521

(51) Int. Cl.
*B60D 1/56* (2006.01)
*B60R 19/34* (2006.01)

(52) U.S. Cl.
CPC .............. *B60D 1/565* (2013.01); *B60R 19/34* (2013.01)

(58) Field of Classification Search
CPC ... B60D 1/52; B60D 1/04; B60D 1/56; B60D 1/565; B60R 19/34
See application file for complete search history.

(56) References Cited

U.S. PATENT DOCUMENTS 8,251,414 B2 * 8/2012 Brown .................... B60R 19/48 293/102
8,419,040 B2 4/2013 Ando
2004/0041416 A1 * 3/2004 Harrison ................ B60D 1/485 293/117
2011/0187081 A1 * 8/2011 Ando ....................... B60D 1/52 280/477
2017/0305220 A1 * 10/2017 Virupaksha ........... B60R 19/023
2018/0037179 A1 * 2/2018 Steinebach ............. B60R 19/34
(Continued)

FOREIGN PATENT DOCUMENTS

CN 108466631 A 8/2018
CN 208278002 U 12/2018
(Continued)

OTHER PUBLICATIONS

Notice of Reasons of Refusal dated Feb. 10, 2025 issued in corresponding JP 2023-091521 application (6 pages).

*Primary Examiner* — Yanick A Akaragwe
(74) *Attorney, Agent, or Firm* — Miki Motohashi Iino; Millen, White, Zelano & Branigan, P.C.

(57) ABSTRACT

Provided is a crash box including a tubular body; a sheet-like lid body; a lashing bracket; and a reinforcing member, in which the tubular body defines a hollow portion in the tubular body, the lid body is joined by spot welding to the tubular body, the lashing bracket supports a lashing hook protruding from the lashing bracket and is placed in such a manner as to be placed on the lid body, and furthermore is coupled to the lid body in such a manner as to, together with the lid body, cover the end portion of the tubular body and close the hollow portion, the reinforcing member is placed along the lashing bracket in the tubular body in such a manner as to cross the hollow portion in the tubular body, and both end portions of the reinforcing member are coupled to the tubular body.

4 Claims, 10 Drawing Sheets

(56) References Cited

U.S. PATENT DOCUMENTS

| | | | | |
|---|---|---|---|---|
| 2019/0381960 | A1* | 12/2019 | Sovic | B60R 19/18 |
| 2022/0363211 | A1* | 11/2022 | Günther | B60R 19/24 |

FOREIGN PATENT DOCUMENTS

| | | | |
|---|---|---|---|
| CN | 110015256 | A | 7/2019 |
| JP | 2011-156987 | A | 8/2011 |
| JP | 5366608 | B2 | 12/2013 |

* cited by examiner

CRASH BOX

CROSS-REFERENCE TO RELATED APPLICATION

This application is based on Japanese Patent Application No. 2023-091521 filed with the Japan Patent Office on Jun. 2, 2023, the entire content of which is hereby incorporated by reference.

BACKGROUND

1. Technical Field

The present disclosure relates to a crash box.

2. Related Art

Bumpers at the front and back of a vehicle body are coupled to side members at the front left and right and back left and right of the vehicle body via crash boxes. A lashing hook used to tow or lash the vehicle is mounted on the front or back side of the crash box as needed. The lashing hook is mounted in such a manner as to penetrate the bumper and protrude forward or backward of the vehicle. A rope or wire is connected to the lashing hook, so that the vehicle or another vehicle can be towed. Hence, it is also possible to lash the vehicle's own body in a transport vessel. Japanese Patent No. 5366608 discloses a crash box on which a lashing hook can be mounted.

The crash box on which the lashing hook can be mounted is formed of steel sheets joined into a box. In this case, it is desirable to join the steel sheets by spot welding for reasons of ease of manufacture. However, there is a constraint on ensuring a required number of spot welding points, depending on the shape of the crash box. Hence, there is a case in which the steel sheets are joined by arc welding and form a crash box to ensure the support strength of the lashing hook.

However, it is difficult to reduce the thickness of a steel sheet in a place to be welded by arc welding as compared to joining by spot welding. Hence, there is a problem that the manufacturing cost and weight of the crash box increase.

A problem to be solved by the embodiments is to reinforce a part that supports a lashing hook with a reinforcing member in a crash box on which the lashing hook can be mounted and therefore enable even the crash box formed by joining by spot welding to ensure the support strength of the lashing hook. In this manner, it is possible to suppress increases in the manufacturing cost and weight of the crash box.

SUMMARY

A crash box according to an embodiment of the present disclosure includes a tubular body; a sheet-like lid body; a lashing bracket; and a reinforcing member, in which the tubular body defines a hollow portion in the tubular body, the lid body is joined by spot welding to the tubular body in such a manner as to cover an end portion of the tubular body and close the hollow portion, the lashing bracket supports a lashing hook protruding from the lashing bracket and is placed in such a manner as to be placed on the lid body, and furthermore is coupled to the lid body in such a manner as to, together with the lid body, cover the end portion of the tubular body and close the hollow portion, the reinforcing member is placed along the lashing bracket in the tubular body in such a manner as to cross the hollow portion in the tubular body, and both end portions of the reinforcing member are coupled to the tubular body.

DETAILED DESCRIPTION

Figure 1:
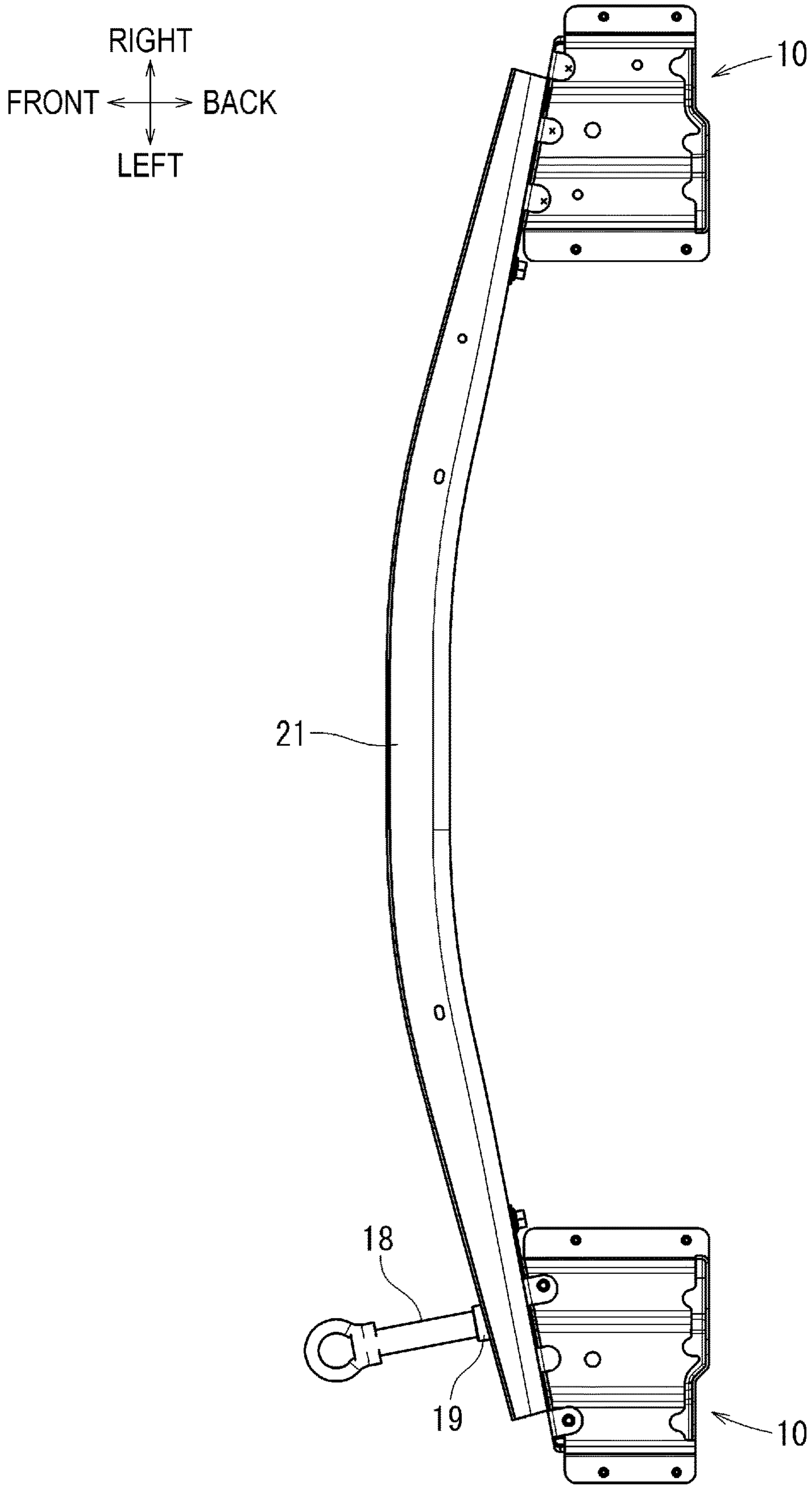
FIG. 1 is a plan view of a bumper device including crash boxes according to the embodiments.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A crash box according to a first embodiment of the present disclosure includes a tubular body; a sheet-like lid body; a lashing bracket; and a reinforcing member, in which the tubular body defines a hollow portion in the tubular body, the lid body is joined by spot welding to the tubular body in such a manner as to cover an end portion of the tubular body and close the hollow portion, the lashing bracket supports a lashing hook protruding from the lashing bracket and is placed in such a manner as to be placed on the lid body, and furthermore is coupled to the lid body in such a manner as to, together with the lid body, cover the end portion of the tubular body and close the hollow portion, the reinforcing member is placed along the lashing bracket in the tubular body in such a manner as to cross the hollow portion in the tubular body, and both end portions of the reinforcing member are coupled to the tubular body.

A crash box according to a second embodiment of the present disclosure is configured such that in the crash box according to the first embodiment, the lid body includes end portions in contact with the tubular body, and flange portions, the flange portions extend from the end portions along surfaces of sheets forming the tubular body, and the both end portions of the reinforcing member are coupled to the flange portions of the lid body and the tubular body.

A crash box according to a third embodiment of the present disclosure is configured such that in the crash box according to the first embodiment, the lashing bracket includes end portions in contact with the tubular body, and flange portions, the flange portions extend from the end portions along surfaces of sheets forming the tubular body, and include through-holes, the both end portions of the reinforcing member are coupled to the tubular body through the through-holes, and an inner diameter of the through-holes has a size that allows restricting movement of the reinforcing member in a direction orthogonal to an insertion direction.

A crash box according to a fourth embodiment of the present disclosure is configured such that in the crash box according to the first embodiment, each of the lid body and the lashing bracket includes end portions in contact with the tubular body, and flange portions, the flange portions extend from the end portions along surfaces of sheets forming the tubular body, the flange portions of the lid body and the flange portions of the lashing bracket are placed in such a manner as to sandwich the end portion of the tubular body in a thickness direction of the sheet, and the both end portions of the reinforcing member are coupled to the tubular body and the flange portions of the lid body through the flange portions of the lashing bracket.

A crash box according to a fifth embodiment of the present disclosure is configured such that in any of the first to the fourth embodiments, the tubular body includes a pair of half bodies, and a split direction of the half bodies agrees with an extension direction of the reinforcing member between the both end portions.

According to the embodiments, a part, to which the lashing bracket is coupled, of the tubular body is reinforced with the reinforcing member. Hence, the strength of the lashing hook against deformation is improved. Hence, it enables even the crash box joined by spot welding to ensure the support strength of the lashing hook. As a result, the thickness of steel sheets forming the tubular body of the crash box according to the embodiments can be reduced as compared to a crash box formed by joining by arc welding. Hence, it is possible to suppress increases in the manufacturing cost and weight of the crash box.

Entire Configuration of First Embodiment

Figure 2:
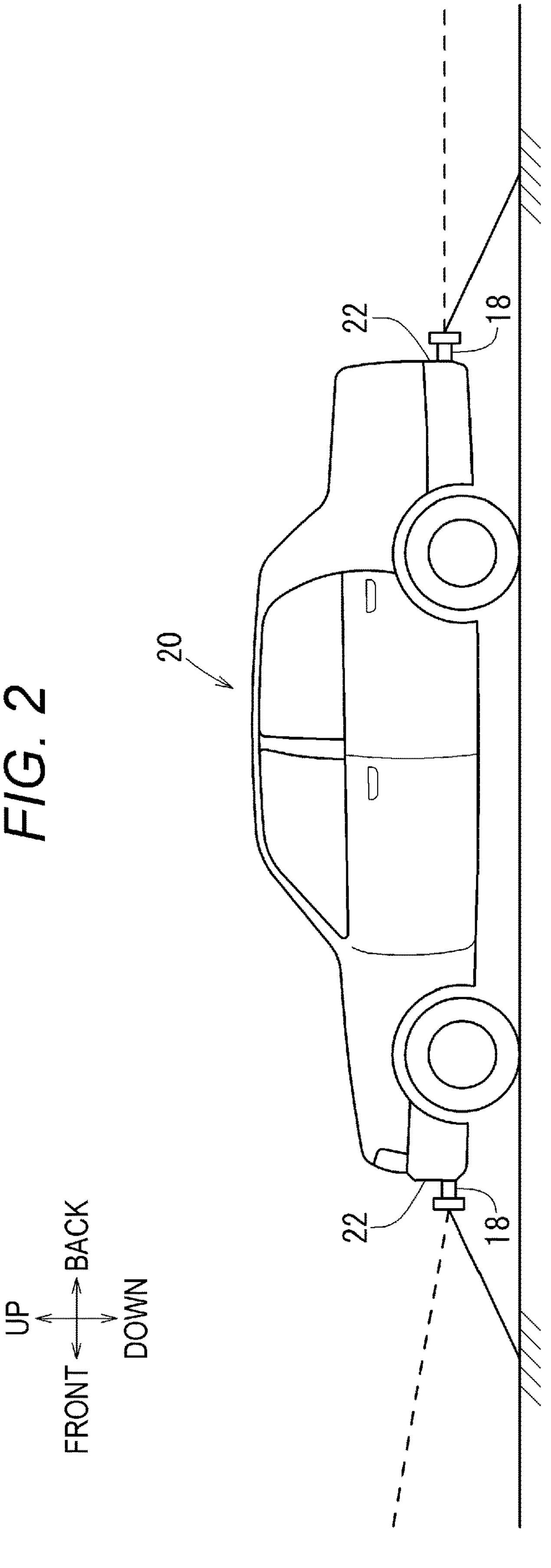
FIG. 2 is a side view of a vehicle including the crash boxes according to the embodiments.
Figure 3:
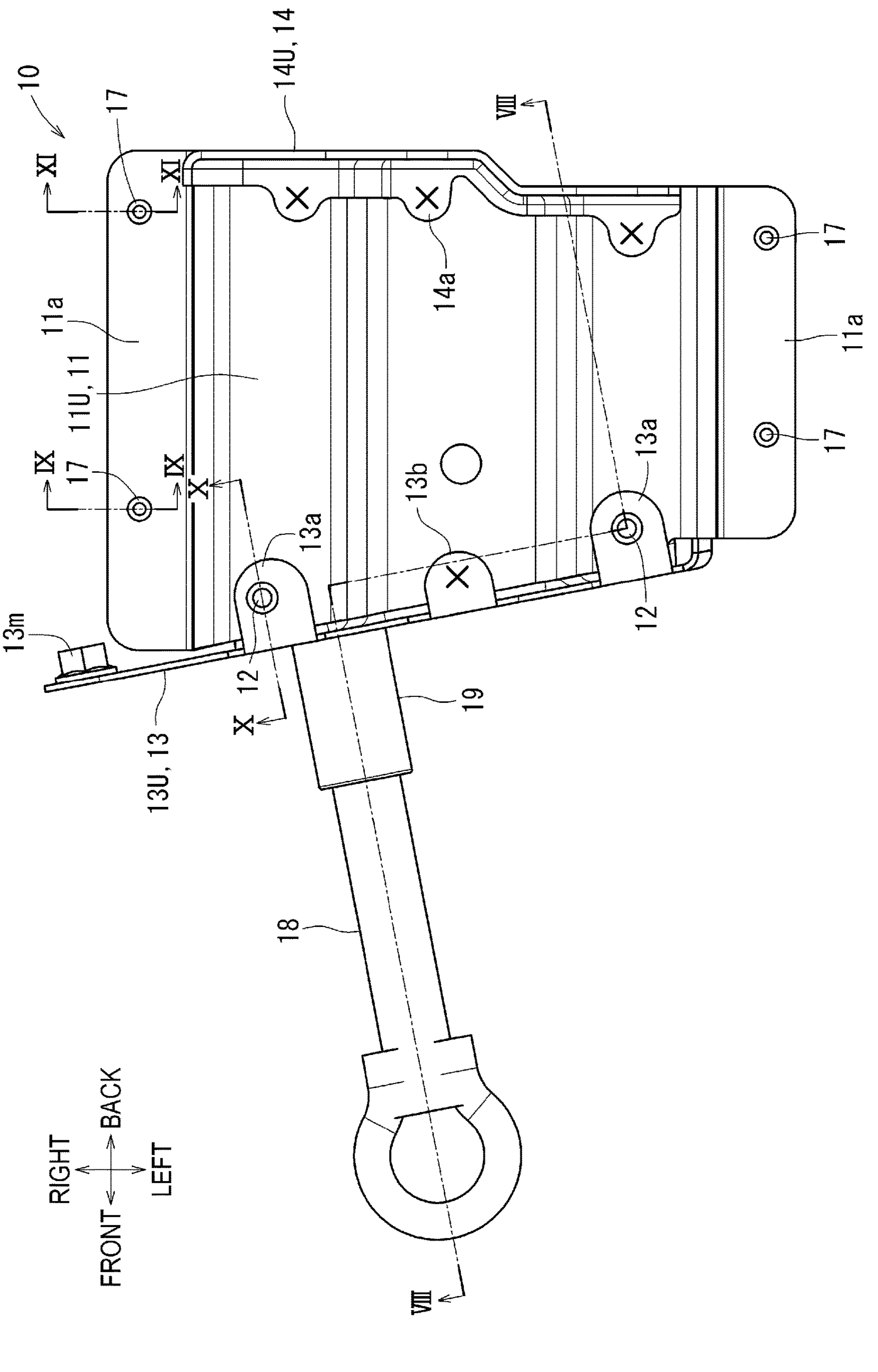
FIG. 3 is an enlarged plan view of the crash box according to the embodiments.

FIG. 1 illustrates crash boxes 10 according to the embodiment, which are coupled to left and right end portions of a bumper reinforcement 21 in the front of a vehicle. Moreover, FIG. 2 illustrates lashing hooks 18 that are mounted on a vehicle 20 in such a manner as to protrude forward and backward of the vehicle from the crash boxes 10 placed in the front and back of the vehicle 20. In each of the drawings, directions of when the forward direction of the vehicle 20 is defined as "front" are indicated by crossing arrows. Descriptions related to the directions are given below based on these directions.

In this case, a total of four crash boxes 10 are provided, distributed to the front, back, left, and right sides of the vehicle. Each of the crash boxes 10 is coupled to the vehicle between the bumper reinforcement 21 in the front or back of the vehicle and a left or right side member (not illustrated) at the front or back of the vehicle body. Each of the entire crash boxes 10 is made of steel sheets as publicly known. The crash boxes 10 have a function of crushing under collision load added from ahead or behind the vehicle via a bumper 22 and absorbing collision energy. Lashing nuts 19 for fastening and fixing the lashing hooks 18 are provided at the front of the crash box 10 in the front of the vehicle and at the back of the crash box 10 in the back of the vehicle.

Through-holes (not illustrated) are bored in the bumpers 22 placed forward and backward of the lashing nuts 19. Consequently, the lashing hooks 18 can be fastened and fixed to the lashing nuts 19 via the through-holes as needed. When one of two vehicles connected with a tow wire or rope tows the other, the tow wire or rope is coupled to the lashing hook 18. Moreover, when the vehicle 20 is lashed to a floor in a transport vessel, lashing wires or ropes are coupled to the lashing hooks 18. In FIG. 2, broken lines drawn in front of and behind the vehicle indicate the lashing wires or ropes coupled to the lashing hooks 18. Moreover, in FIG. 2, solid lines drawn at the front and back of the vehicle between the vehicle and the floor indicate the lashing wires or ropes coupled to the lashing hooks 18. In this manner, when the vehicle 20 tows, or is towed by, another vehicle, or is lashed, with the lashing hooks 18 connected to the tow wires or ropes, relatively large forces that are sufficient to support the weight of the vehicle are added to the crash boxes 10 via the lashing hooks 18.

The configuration of the crash box 10 alone is described below based on FIGS. 3 to 11. The crash box 10 placed in the front left in FIG. 1 is described. The crash box 10 placed in the front right in FIG. 1 is configured in such a manner as to be symmetric about a line with respect to the crash box 10 placed in the front left. Moreover, the crash box 10 placed in the back right of the vehicle is configured in such a manner as to be symmetric about a point with respect to the crash box 10 placed in the front left. The crash box 10 placed in the back left of the vehicle is configured in such a manner as to be symmetric about a point with respect to the crash box 10 placed in the front right.

Configurations of Tubular Body 11 and Lid Body 13 of Crash Box 10

As in FIGS. 4 to 8, a tubular body 11 includes an upper half body 11U and a lower half body 11D. As in FIG. 5, the upper half body 11U and the lower half body 11D are assembled in such a manner as to be placed on top of each other in the up-and-down direction, and form an approximately square tubular body 11. The tubular body 11's shape itself is publicly known. The tubular body 11 may be formed of one sheet bent into a tube instead of including the upper half body 11U and the lower half body 11D.

Flange portions 11*a* that extend in opposite directions to each other in the left-and-right direction and flange portions 11*b* that extend in opposite directions to each other in the left-and-right direction are placed in parts that come into contact with each other when the upper half body 11U and the lower half body 11D are assembled in the up-and-down direction. A plurality of (in this case, two) through-holes 11*c* (FIG. 7) spaced apart in the front-and-back direction and a plurality of (in this case, two) through-holes 11*e* (FIG. 7) spaced apart in the front-and-back direction are bored in flat surfaces of the flange portions 11*a* and 11*b*. The half bodies 11U and 11D are riveted in the up-and-down direction with short rivet pins 17 inserted through the through-holes 11*c* and 11*e*. Consequently, as in FIGS. 9 and 11, the upper half body 11U and the lower half body 11D are coupled together to form one tubular body 11.

Figure 4:
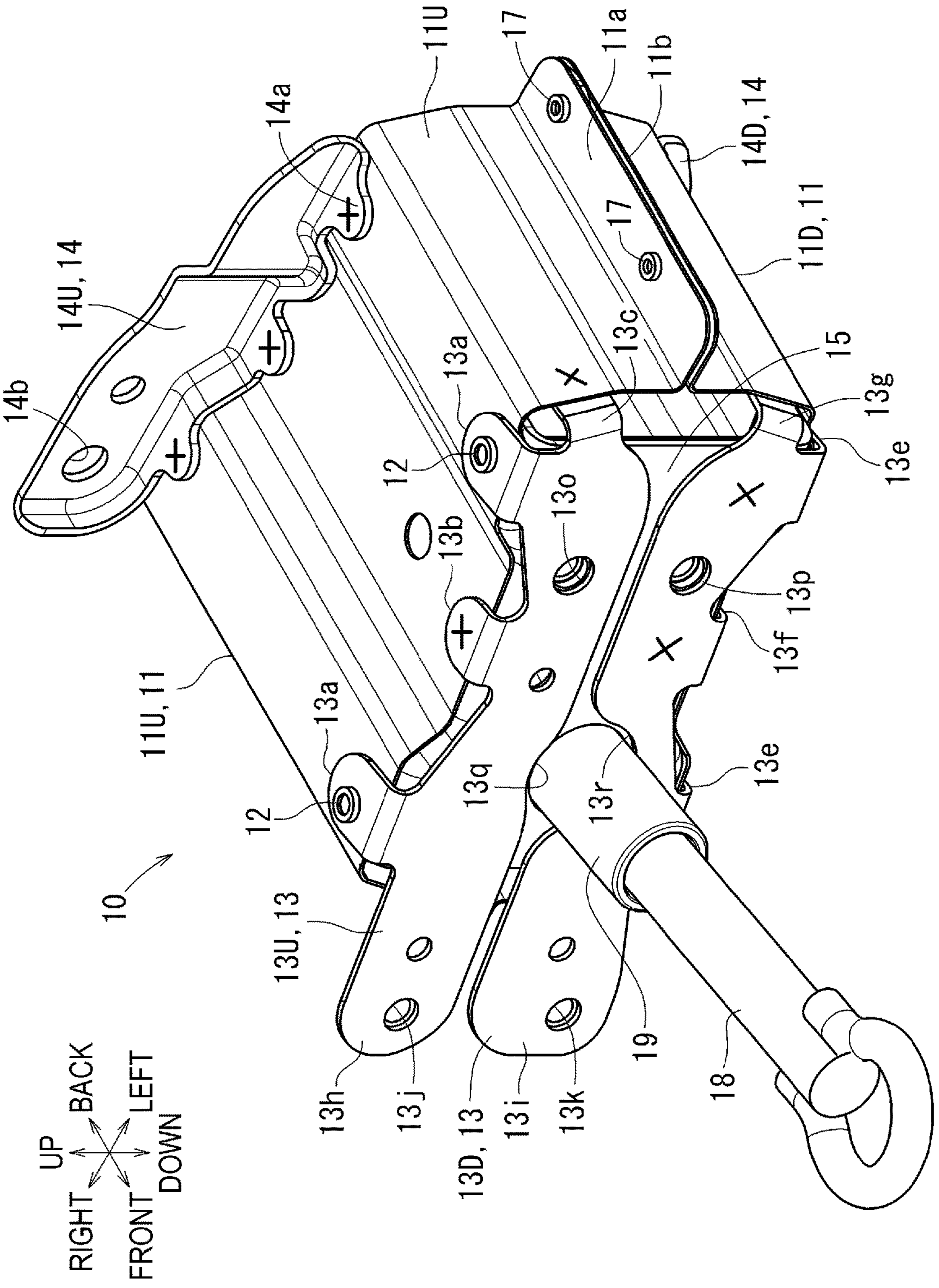
FIG. 4 is an enlarged perspective view of the crash box according to the embodiments.
Figure 5:
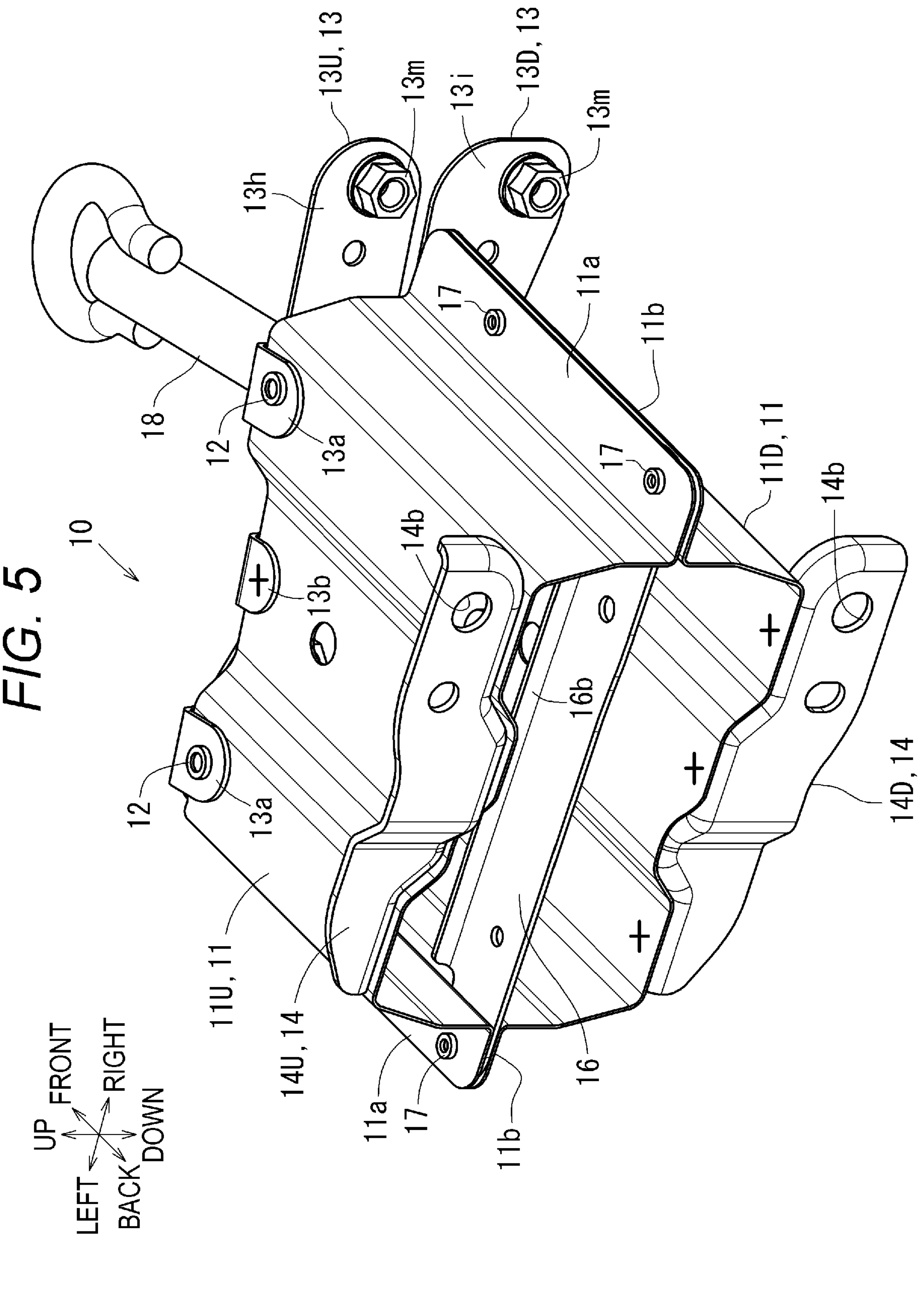
FIG. 5 is an enlarged perspective view of the crash box according to the embodiments, as viewed in a different direction from FIG. 4.
Figure 7:
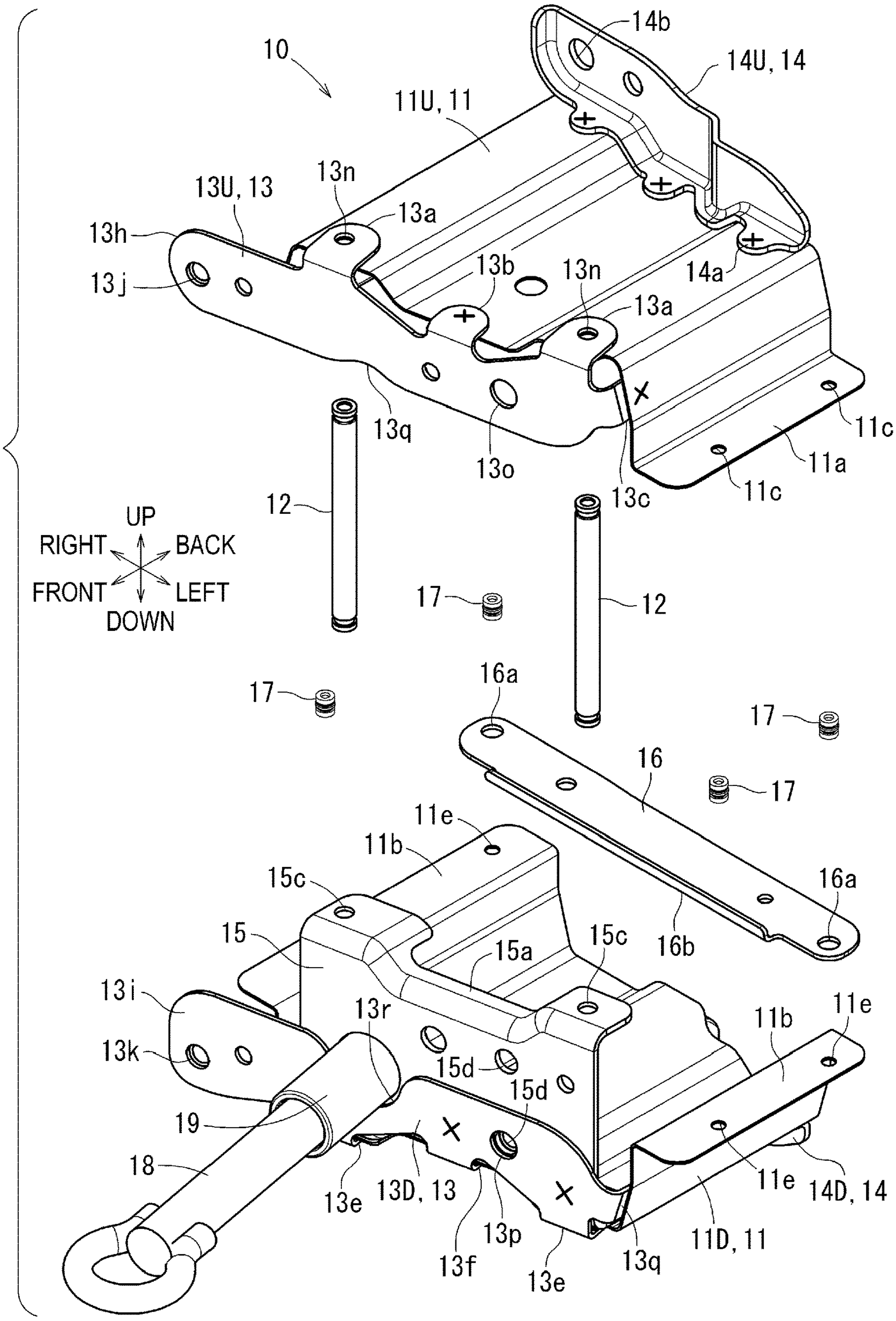
FIG. 7 is an exploded perspective view of the crash box according to the embodiments.

As in FIGS. 4 and 7, a sheet-like upper lid body 13U and a lower lid body 13D each extending in the left-and-right direction are joined by spot welding to front end portions of the upper half body 11U and the lower half body 11D. In each drawing, x marks indicate parts to be spot-welded. Other parts to be spot-welded are also indicated by a similar method. As in FIG. 4, when the upper half body 11U and the lower half body 11D are assembled together to form the tubular body 11, the upper lid body 13U and the lower lid body 13D cover the front end portion of the tubular body 11 in such a manner as to define a closed hollow portion in the tubular body 11. The upper lid body 13U includes a plurality of (in this case, four) flange portions 13*a* to 13*c* that extend individually along surfaces of a sheet of the tubular body 11. Of them, three flange portions 13*a* and 13*b* extend along an outer wall surface of the tubular body 11. The remaining one flange portion 13*c* extends along an inner wall surface of the tubular body 11. Similarly, the lower lid body 13D includes a plurality of (in this case, four) flange portions 13*e* to 13*g* that extend individually along surfaces of a sheet of the tubular body 11. Of them, three flange portions 13*e* and 13*f* extend along the outer wall surface of the tubular body 11. The remaining one flange portion 13*g* extends along the inner wall surface of the tubular body 11.

Of the three flange portions 13*a* and 13*b* that extend along the outer wall surface of the tubular body 11, the flange portions 13*a* located on both the left and right sides are riveted to the front end portion of the upper half body 11U with upper end portions of elongated rivet pins 12 described below. Similarly, of the three flange portions 13*e* and 13*f* that extend along the outer wall surface, the flange portions 13*e* located on both the left and right sides are riveted to the front end portion of the lower half body 11D with lower end portions of the above-mentioned elongated rivet pins 12. Hence, through-holes 13*n* that penetrate in the up-and-down direction are bored in the flange portions 13*a* and 13*e*, respectively (through-holes in the flange portions 13*e* are not illustrated). Moreover, of the three flange portions 13*a* and 13*b*, the central flange portion 13*b* located between the left and right flange portions 13*a* is joined by spot welding to the front end portion of the upper half body 11U. Similarly, of the three flange portions 13*e* and 13*f*, the central flange portion 13*f* located between the left and right flange portions 13*e* is joined by spot welding to the front end portion of the lower half body 11D. Furthermore, the flange portion 13*c* that extends along the inner wall surface of the tubular body 11 is joined by spot welding to the front end portion of the upper half body 11U. On the other hand, the flange portion 13*g* that extends along the inner wall surface of the tubular body 11 is in contact with the inner wall surface of the front end portion of the lower half body 11D.

The upper lid body 13U includes an extension portion 13*h* in its right end portion. Similarly, the lower lid body 13D includes an extension portion 13*i* in its right end portion. The extension portions 13*h* and 13*i* extend and protrude outward of the hollow portion in the tubular body 11 beyond areas of portions, which cover the hollow portion, of the upper lid body 13U and the lower lid body 13D. A through-hole 13*j* that penetrates in the front-and-back direction is bored in a distal end portion of the extension portion 13*h*. As in FIG. 6, a weld nut 13*m* is joined by welding to a back surface of the extension portion 13*h*, corresponding to the through-hole 13*j*. Similarly, a through-hole 13*k* that penetrates in the front-and-back direction is bored in a distal end portion of the extension portion 13*i*. A weld nut 13*m* is joined by welding to a back surface of the extension portion 13*i*, corresponding to the through-hole 13*k*.

Figure 6:
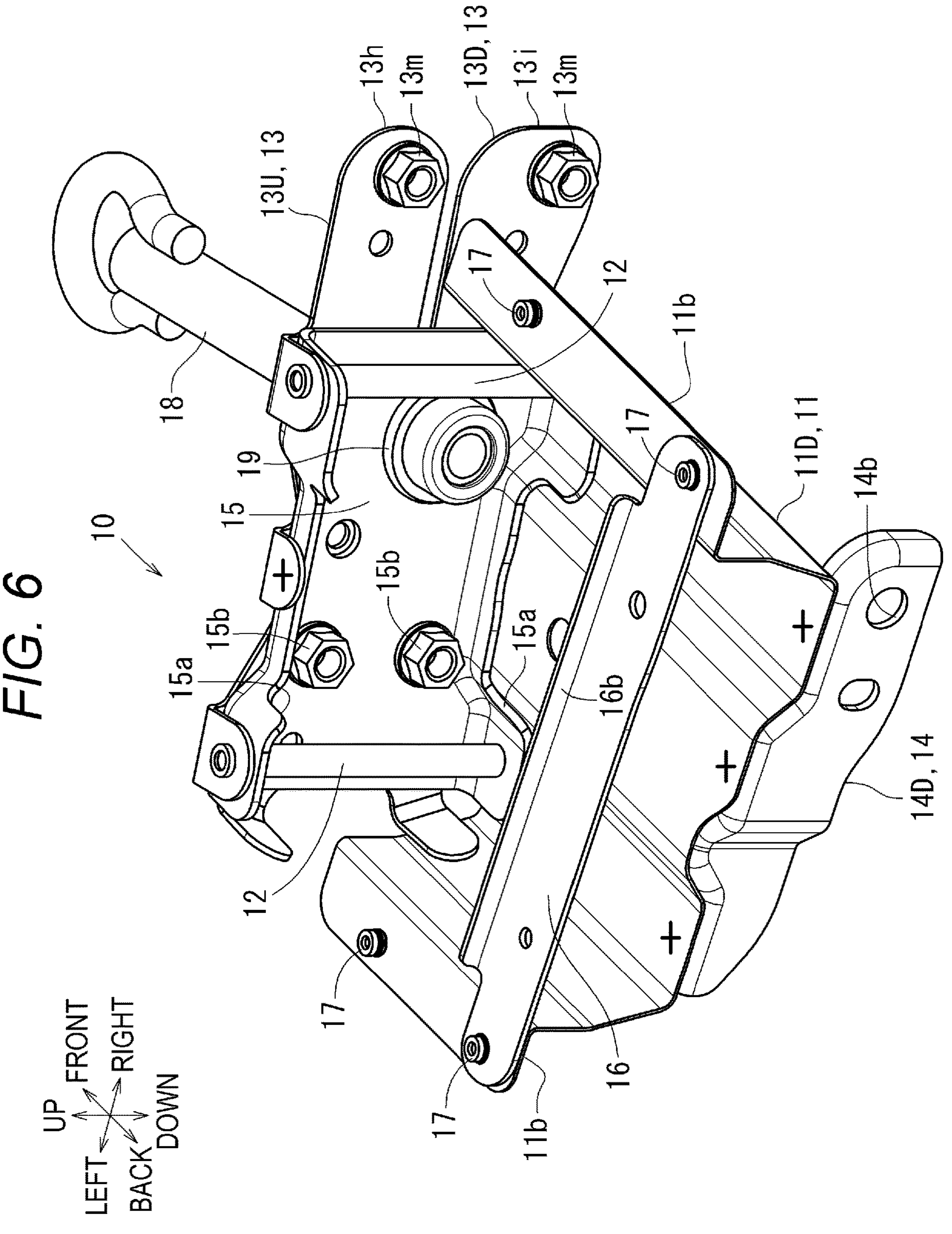
FIG. 6 is a perspective view similar to FIG. 5, from which one of half bodies forming a tubular body has been removed.

As in FIGS. 6 and 7, an approximately square sheet-like lashing bracket 15 is joined by spot welding to a back surface of the lower lid body 13D. Spot welding is performed in two places indicated by x marks above the flange portions 13*e* and 13*f* on a surface of a sheet of the lower lid body 13D (refer to FIG. 7). Moreover, a through-hole 130 that penetrates in the front-and-back direction is bored in a left end portion of the upper lid body 13U. Through-holes 15*d* are bored in the lashing bracket 15, corresponding respectively to the through-hole 130 and a through-hole 13*p* (refer to FIG. 7). Similarly, the through-hole 13*p* that penetrates in the front-and-back direction is bored in a left end portion of the lower lid body 13D. The through-hole 15*d* is bored in the lashing bracket 15, corresponding to the through-hole 13*p* (refer to FIG. 7). Furthermore, as in FIG. 6, weld nuts 15*b* are joined by welding to a back surface of the lashing bracket 15, corresponding respectively to the through-holes 15*d*. These weld nuts 13*m* and 15*b* are used as bolt fastening nuts to couple the crash box 10 to the bumper reinforcement 21.

Configuration of Lashing Bracket 15 of Crash Box 10

Figure 8:
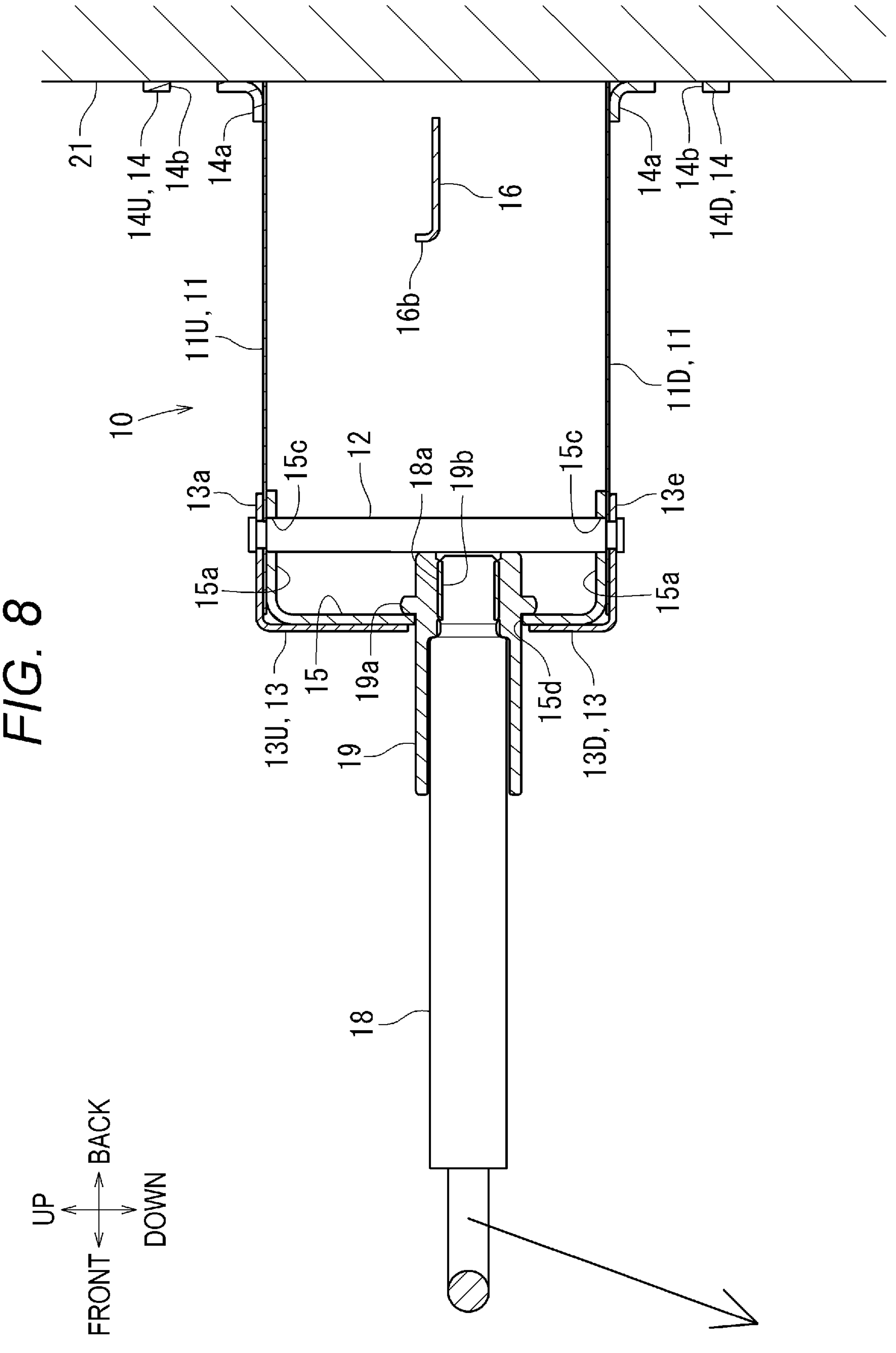
FIG. 8 is a cross-sectional view taken along line VIII-VIII of FIG. 3, as viewed in the direction of arrows.
Figure 9:
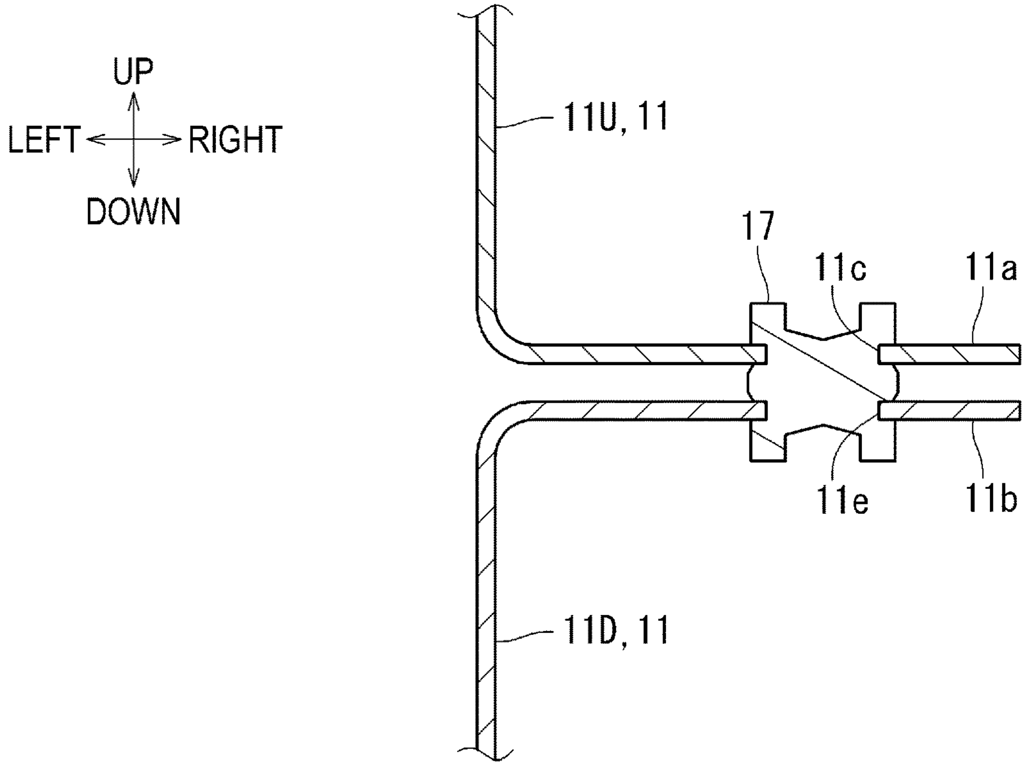
FIG. 9 is a cross-sectional view taken along line IX-IX of FIG. 3, as viewed in the direction of arrows.
Figure 10:
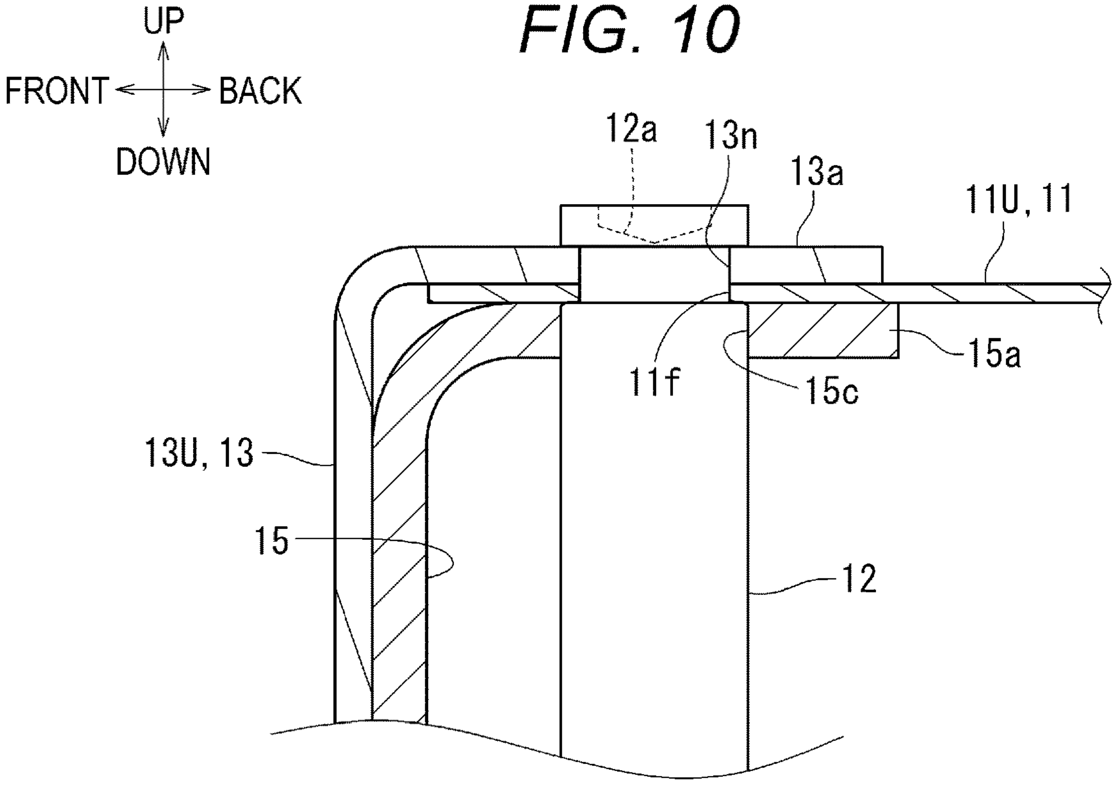
FIG. 10 is a cross-sectional view taken along line X-X of FIG. 3, as viewed in the direction of arrows.
Figure 11:
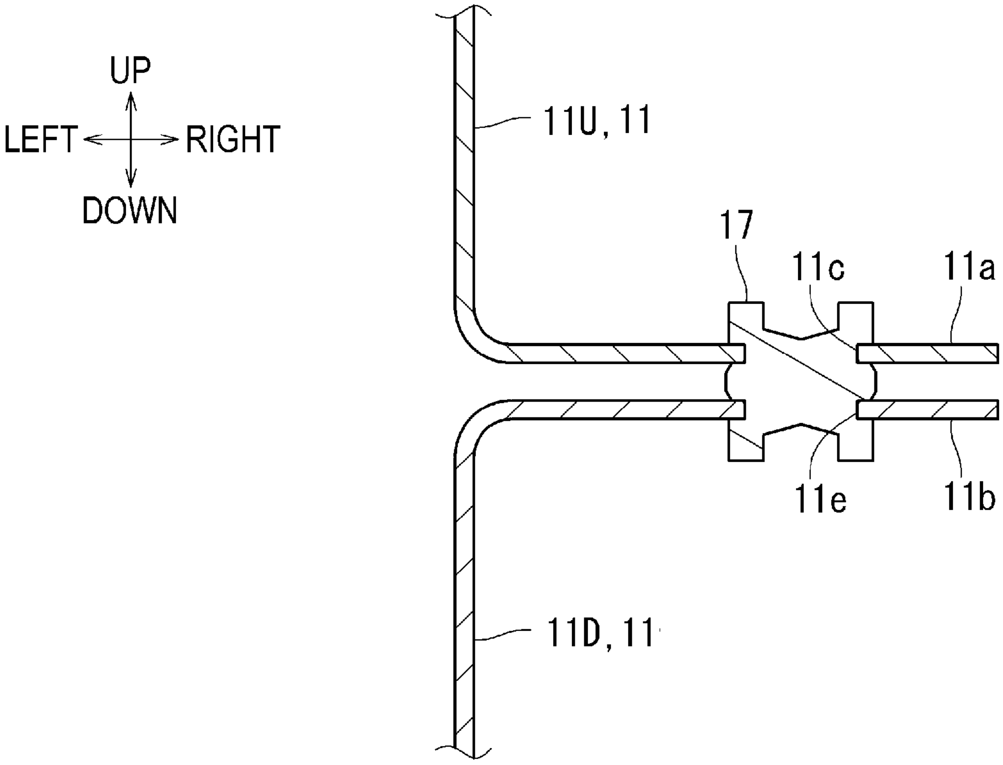
FIG. 11 is a cross-sectional view taken along line XI-XI of FIG. 3, as viewed in the direction of arrows.

As in FIGS. 6 to 8, the approximately square sheet-like lashing bracket 15 is placed in such a manner that its sheet surface covers the front end portion of the tubular body 11. Hence, the lashing bracket 15 has the shape and size that substantially cover the hollow portion of the tubular body 11. Each of upper and lower ends of the lashing bracket 15 is bent backward to form a flange portion 15*a*. A top surface of the upper flange portion 15*a* is in contact with the upper inner wall surface of the front end portion of the tubular body 11. Similarly, an undersurface of the lower flange portion 15*a* is in contact with the lower inner wall surface of the front end portion of the tubular body 11. A through-hole 15*c* that penetrates in the up-and-down direction is bored in each of left and right end portions of the upper flange portion 15*a*. Similarly, a through-hole 15*c* that penetrates in the up-and-down direction is bored in each of left and right end portions of the lower flange portion 15*a*. As described above, the elongated rivet pins 12 that are round bars are inserted through the through-holes 15*c* in the up-and-down direction. The elongated rivet pins 12 correspond to the reinforcing member for the part that supports the lashing hook. In the illustrated example, the inner diameter of the through-holes 15*c* is set at a minimum inner diameter that allows the elongated rivet pins 12 to be inserted therethrough. Here, the minimum inner diameter indicates an inner diameter that can restrict the movement of the elongated rivet pins 12 in a direction orthogonal to an insertion direction.

A through-hole 15*d* that penetrates in the front-and-back direction is bored in a portion off the central portion to the bottom right corner on a surface of a sheet of the lashing bracket 15. The approximately cylindrical lashing nut 19 is inserted through the through-hole 15*d* from the back to the front of the lashing bracket 15. An annular flange portion 19*a* is formed integrally with an outer peripheral surface of the lashing nut 19 along its entire perimeter. The flange portion 19*a* is joined by arc welding to the lashing bracket 15 with an annular front end surface of the flange portion 19*a* in contact with the back surface of the lashing bracket 15. A female thread 19*b* is formed on an inner peripheral surface on a back end side of the lashing nut 19. A male thread 18*a* formed at a distal end of the lashing hook 18 is threadedly engaged with the female thread 19*b*. Consequently, the lashing hook 18 can be fastened and fixed to the lashing nut 19. Notches 13*q* and 13*r* are formed in the upper lid body 13U and the lower lid body 13D, which are placed on a front surface of the lashing bracket 15, in such a manner as to avoid interference with the outer peripheral surface of the lashing nut 19. The lashing bracket 15 is set to be thicker in sheet thickness than the tubular body 11 and the lid body 13 to endure a force from the lashing hook 18. The tubular body 11 is set to be thin in sheet thickness to allow it to be crushed under collision load. Hence, the sheet thicknesses of the lashing bracket 15, the lid body 13, and the tubular body 11 are reduced in stages in this order.

Configuration of Reinforcing Member of Crash Box 10

As in FIGS. 6 to 8 and 10, the reinforcing member includes two elongated rivet pins 12. Each of the elongated rivet pins 12 is a round bar having a thickness that allows it to be just inserted through the through-hole 15*c* of the lashing bracket 15. Moreover, upper and lower distal end portions of the each of the elongated rivet pins 12 have a stepped shape. Hence, the upper and lower distal end portions of the each of the elongated rivet pins 12 are one step thinner than a central portion thereof in the up-and-down direction. The diameter of the upper end portions of the elongated rivet pins 12 is set at an outer diameter that allows them to be just inserted through the through-holes 13*n* in the flange portions 13*a* of the upper lid body 13U and through-holes 11*f* (FIG. 10) in the front end portion of the tubular body 11 on which the flange portions 13*a* are placed in a sheet thickness direction thereof. Similarly, the diameter of the lower end portions of the elongated rivet pins 12 is set at an outer diameter that allows them to be just inserted through the through-holes 13*n* in the flange portions 13*e* of the lower lid body 13D and the through-holes 11*f* in the front end portion of the tubular body 11 that is placed on the flange portions 13*e* in a sheet thickness direction thereof. The through-holes 11*f* are formed in such a manner as to correspond to the through-holes 13*n*, respectively.

In the illustrated example, the elongated rivet pin 12 is inserted through the through-hole 15*c*, the through-hole 11*f*, and the through-hole 13*n*, and upper and lower end surfaces of the elongated rivet pin 12 are riveted with a riveting tool in the major axis direction of the elongated rivet pin 12. Consequently, as indicated by a broken line in FIG. 10, a rivet dent 12*a* is formed in each of the upper and lower end surfaces of the elongated rivet pin 12. As a result, the outer diameter of a distal end portion of the elongated rivet pin 12 increases by the volume of the rivet dent 12*a*. In this manner, the flange portion 13*a* of the upper lid body 13U and the front end portion of the tubular body 11 are coupled to the upper end of the elongated rivet pin 12. Similarly, the flange portion 13*e* of the lower lid body 13D and the front end portion of the tubular body 11 are coupled to the lower end of the elongated rivet pin 12.

Configuration of Shape Holding Plate 16 of Crash Box 10

As in FIGS. 5 to 8, a shape holding plate 16 is a plate member that, as a whole, is elongated. The shape holding plate 16 is held between back end portions of the flange portions 11*a* of the upper half body 11U and back end portions of the flange portions 11*b* of the lower half body 11D in such a manner that the front side of the shape holding plate faces upward and the back side faces downward. Through-holes 16*a* are bored in left and right end portions of the shape holding plate 16. The through-holes 16*a* penetrate the shape holding plate 16 in the up-and-down direction. The short rivet pins 17 are inserted through the through-holes 16*a* in the left and right end portions of the shape holding plate 16 via the flange portions 11*a* of the upper half body 11U and the flange portions 11*b* of the lower half body 11D. The shape holding plate 16 is riveted with the short rivet pins 17. In other words, the shape holding plate 16 is riveted and coupled to the flange portions 11*a* and 11*b* with the short rivet pins 17. Moreover, a front end portion of the shape holding plate 16 is bent upward to form a rib 16*b*. Hence, the bending deformation strength in a longitudinal direction of the shape holding plate 16 is enhanced. Therefore, the shape holding plate 16 suppresses deformation of a back part of the tubular body 11 in the left-and-right direction.

Configuration of Mounting Bracket 14 of Crash Box 10

As in FIGS. 4 to 8, a mounting bracket 14 is coupled to a back end portion of the tubular body 11. The mounting bracket 14 includes an upper bracket 14U and a lower bracket 14D. The upper bracket 14U is placed along an upper surface of the upper half body 11U forming the tubular body 11. Moreover, the lower bracket 14D is placed along a lower surface of the lower half body 11D. Hence, the upper bracket 14U has a shape along the shape of the surface of the upper half body 11U. Moreover, a flange portion 14*a* is formed in an end portion, which is closer to the front side of the upper half body 11U, of the upper bracket 14U. Similarly, the lower bracket 14D has a shape along the shape of the surface of the lower half body 11D. Moreover, a flange portion 14*a* is formed in an end portion, which is closer to the front side of the lower half body 11D, of the lower bracket 14D. Each of the flange portions 14*a* is formed in such a manner as to bend forward along the surface of the upper half body 11U or the surface of the lower half body 11D. The each of the flange portions 14*a* is joined by spot welding to the surface of the upper half body 11U or the surface of the lower half body 11D. In the illustrated example, the flange portion 14*a* of each of the upper bracket 14U and the lower bracket 14D is spot-welded in three places indicated by x marks.

The upper bracket 14U and the lower bracket 14D are used to fasten and couple the crash box 10 to an unillustrated side frame of the vehicle body with bolts and nuts. Hence, a back surface of the upper bracket 14U, a back surface of the lower bracket 14D, and the back end portion of the tubular body 11 have shapes that fit the shape of a coupling surface of the side frame. Moreover, a through-hole 14*b* that penetrates in the front-and-back direction is formed in a right end portion of each of the upper bracket 14U and the lower bracket 14D. A fastening bolt can be inserted through each of the through-holes 14*b*. The flange portions 14*a* are formed in such a manner as to extend around the through-holes 14*b*. The flange portions 14*a* around the through-holes 14*b* function as ribs, and enhance the bending strength of the upper bracket 14U and the lower bracket 14D.

Operations and Effects of First Embodiment

In the crash box 10 according to the first embodiment, the two elongated rivet pins 12 are coupled to the front part, which is coupled to the lashing bracket 15, of the tubular body 11. The two elongated rivet pins 12 are placed in such a manner as to be parallel to the surface of the lashing bracket 15. In addition, the flange portions 15*a* of the lashing bracket 15 are penetrated by the elongated rivet pins 12. Hence, among components of the force that is added to the lashing hook 18, components in directions along the surfaces of the sheets of the tubular body 11 are transferred to the elongated rivet pins 12 that penetrate through the through-holes 15*c* of the lashing bracket 15. As a result, the force that is transferred to the lashing bracket 15 via the lashing hook 18 is also transferred to the elongated rivet pins 12. Hence, the deformation of the lashing bracket 15 and the tubular body 11 is suppressed.

Moreover, the elongated rivet pins 12 form a closed section structure, together with the lashing bracket 15 and the lid body 13 that is coupled to the lashing bracket 15 in such a manner as to be placed on top of the lashing bracket 15, mating their surfaces together. Hence, the closed section structure supports the tubular body 11 that is deformed by the force transferred via the lashing hook 18. As a result, the support strength of the lashing hook 18 can be increased as compared to a case without the elongated rivet pins 12. In other words, the support strength of the lashing hook 18 can be ensured at an appropriate level even for the crash box 10 that is joined by spot welding. Therefore, the steel sheets forming the tubular body 11 of the crash box 10 can be thinned as compared to formation by joining by arc welding. Hence, increases in the manufacturing cost and weight can be suppressed.

An end portion, which is close to the lashing bracket 15, of the tubular body 11 is hemmed by the flange portions 13*a* and 13*b* of the upper lid body 13U, the flange portions 13*e* and 13*f* of the lower lid body 13D, and the upper and lower flange portions 15*a* of the lashing bracket 15. Consequently, the deformation strength of the end portion, which is close to the lashing bracket 15, of the tubular body 11 is reinforced. Hence, the sheet thickness of the tubular body 11 can be reduced. As a result, the weight of the crash box 10 can be reduced.

The split direction of the upper half body 11U and the lower half body 11D, which form the tubular body 11, agrees with an extension direction of the elongated rivet pin 12 between both end portions thereof. Moreover, the upper half body 11U and the lower half body 11D are coupled together in such a manner as to be placed on top of each other in the up-and-down direction and form the tubular body 11. Hence, when the tubular body 11 is formed, the elongated rivet pins 12 can be inserted through the through-holes 15*c* of the lashing bracket 15 at the same time. Furthermore, the upper and lower ends of the elongated rivet pins 12 can be inserted through the front end portion of the upper half body 11U, the front end portion of the lower half body 11D, the through-holes 13*n* in the flange portions 13*a* and 13*b* of the upper lid body 13U, and the through-holes 13*n* in the flange portions 13*e* and 13*f* of the lower lid body 13D. Hence, the productivity of the crash box 10 can be enhanced.

The lid body 13 is split into the upper lid body 13U and the lower lid body 13D. Hence, before the upper half body 11U and the lower half body 11D are coupled together, the upper lid body 13U and the lower lid body 13D can be individually joined by spot welding to the upper half body 11U and the lower half body 11D, respectively. In addition, the lower lid body 13D (or the upper lid body 13U) and the lashing bracket 15, which have been integrated into one by joining, can be integrated with the lower half body 11D that has not been coupled yet. In this manner, after the lid body 13 and the lashing bracket 15 are coupled to one of the upper half body 11U and the lower half body 11D, which are still separated from each other in the up-and-down direction, the upper half body 11U and the lower half body 11D are coupled together to form the tubular body 11. Consequently, the crash box 10 including the lid body 13 and the lashing bracket 15 can be formed at a stretch.

Operations and Effects of Second to Fifth Embodiments

The operations and effects of the crash box according to the second to fifth embodiments are additionally described below.

In the crash box according to the second embodiment, the tubular body, and the flange portions, which extend along the surfaces of the sheets forming the tubular body, of the lid body are coupled to the both end portions of the reinforcing member. Hence, the reinforcing member, together with the lid body and the lashing bracket, forms a closed section structure. Therefore, the closed section structure supports the tubular body, which is deformed by a force transferred via the lashing hook. As a result, the support strength of the lashing hook can be increased as compared to a case without the reinforcing member.

In the crash box according to the third embodiment, the reinforcing member penetrates the flange portions of the lashing bracket. Hence, among components of a force that is added to the lashing hook, components in directions along the surfaces of the sheets forming the tubular body are transferred to the reinforcing member penetrating the through-holes in the lashing bracket. Hence, the reinforcing member supports the lashing bracket, so that the support strength of the lashing hook can be enhanced.

In the crash box according to the fourth embodiment, the end portion, which is close to the lashing bracket, of the tubular body is held between the flange portions of the lid body and the flange portions of the lashing bracket. Consequently, the end portion, which is close to the lashing bracket, of the tubular body can be reinforced.

In the crash box according to the fifth embodiment, the tubular body including the half bodies, together with the reinforcing member, can be assembled in the same step. Hence, the productivity of the crash box can be enhanced.

Other Embodiments

Up to this point the specific embodiments have been described. However, the crash box according to the embodiments are not limited to the external appearance or configuration of the crash box according to the above embodiments. Various modifications, additions, and deletions can be made to the crash box according to the above embodiments. For example, in the above embodiments, the reinforcing member is formed as the elongated rivet pin 12. However, the elongated rivet pin 12 can also be formed by a sheet-like member as in the shape holding plate 16.

What is claimed is:

1. A crash box comprising:

a tubular body;

a sheet-like lid body;

a lashing bracket; and a reinforcing member, wherein the tubular body defines a hollow portion in the tubular body, the lid body is joined by spot welding to the tubular body in such a manner as to cover an end portion of the tubular body and close the hollow portion, the lashing bracket supports a lashing hook protruding from the lashing bracket and is placed in such a manner as to be placed on the lid body, and furthermore is coupled to the lid body in such a manner as to, together with the lid body, cover the end portion of the tubular body and close the hollow portion, the reinforcing member is placed along the lashing bracket in the tubular body in such a manner as to cross the hollow portion in the tubular body, two end portions of the reinforcing member are coupled to the tubular body, the lashing bracket includes end portions in contact with the tubular body, and flange portions, the flange portions extend from the end portions along surfaces of sheets forming the tubular body, and include through-holes, the two end portions of the reinforcing member are coupled to the tubular body through the through-holes, and an inner diameter of the through-holes has a size that allows restricting movement of the reinforcing member in a direction orthogonal to an insertion direction.

2. The crash box according to claim 1, wherein the lid body also includes end portions in contact with the tubular body, and flange portions, the flange portions of the lid body extend from the end portions of the lid body along surfaces of sheets forming the tubular body, and the two end portions of the reinforcing member are coupled to the flange portions of the lid body and the tubular body.

3. The crash box according to claim 1, wherein the lid body also includes end portions in contact with the tubular body, and flange portions, the flange portions of the lid body extend from the end portions along surfaces of sheets forming the tubular body, the flange portions of the lid body and the flange portions of the lashing bracket are placed in such a manner as to sandwich the end portion of the tubular body in a thickness direction of the sheet, and the two end portions of the reinforcing member are coupled to the tubular body and the flange portions of the lid body through the flange portions of the lashing bracket.

4. The crash box according to claim 1, wherein the tubular body includes a pair of half bodies, and a split direction of the half bodies agrees with an extension direction of the reinforcing member between the both end portions.

* * * * *